May 11, 1954   D. W. SCHNEIDER   2,677,994
METHOD OF AND MEANS FOR AUTOMATICALLY PICKING WASTE
MATERIAL FROM CARTON BLANKS AND THE LIKE ARTICLES
Filed Sept. 2, 1949   7 Sheets-Sheet 1

INVENTOR.
David W. Schneider
BY

May 11, 1954            D. W. SCHNEIDER            2,677,994
METHOD OF AND MEANS FOR AUTOMATICALLY PICKING WASTE
MATERIAL FROM CARTON BLANKS AND THE LIKE ARTICLES
Filed Sept. 2, 1949            7 Sheets-Sheet 2

Fig. 2

INVENTOR.
David W. Schneider
BY
Wilkinson Huxley
Byron & Hume

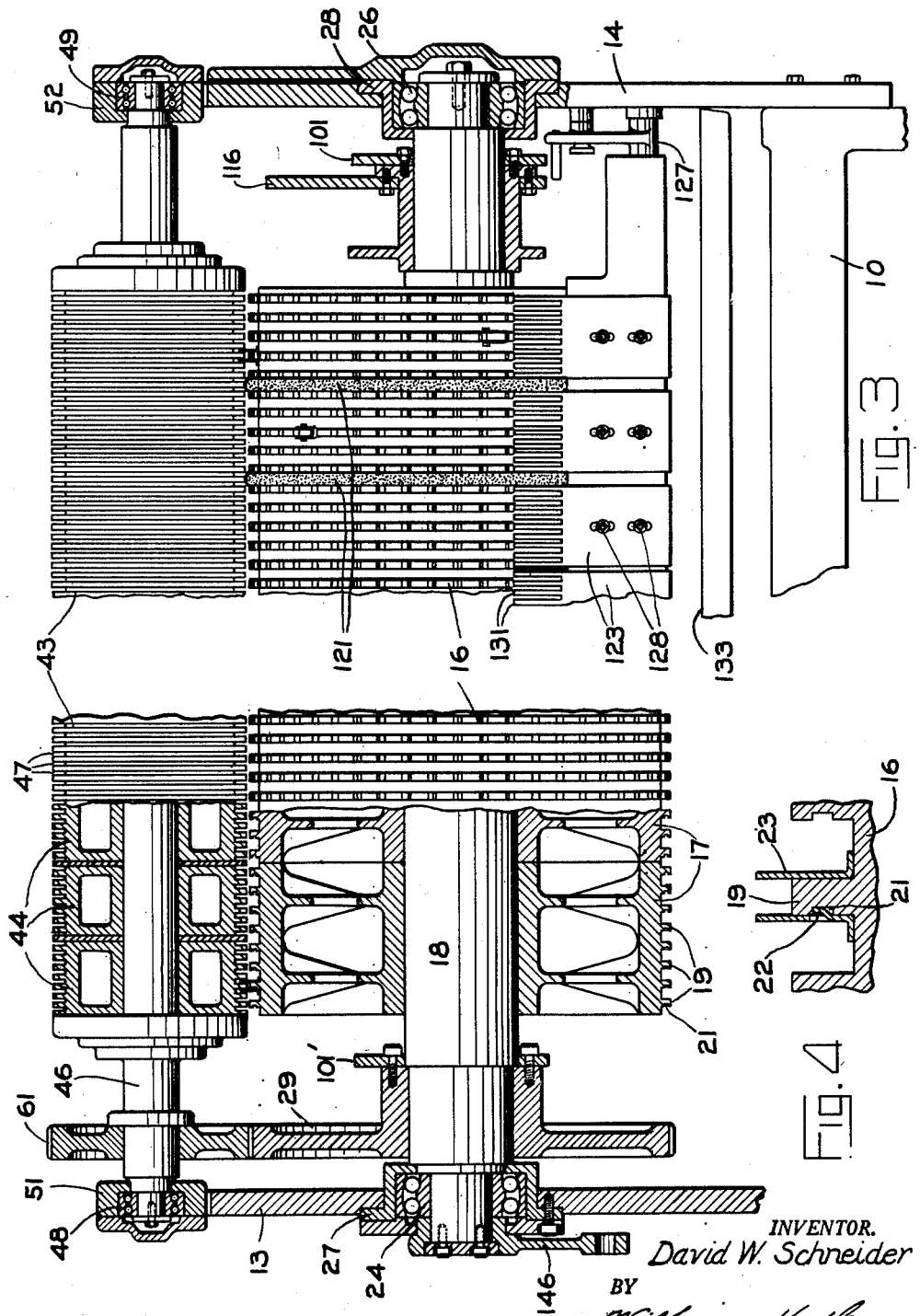

May 11, 1954
D. W. SCHNEIDER
2,677,994
METHOD OF AND MEANS FOR AUTOMATICALLY PICKING WASTE
MATERIAL FROM CARTON BLANKS AND THE LIKE ARTICLES
Filed Sept. 2, 1949
7 Sheets-Sheet 4
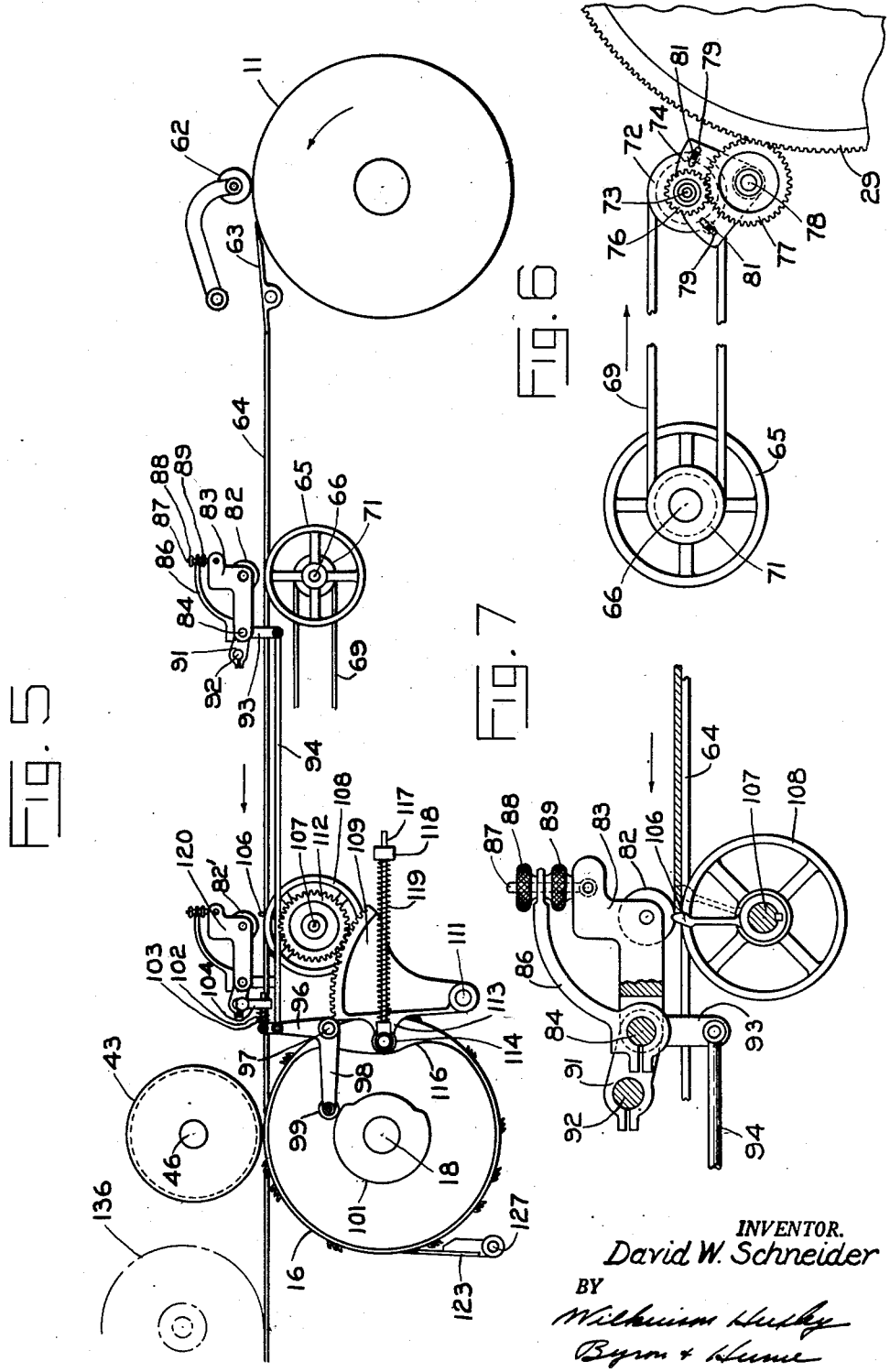
INVENTOR.
David W. Schneider
BY

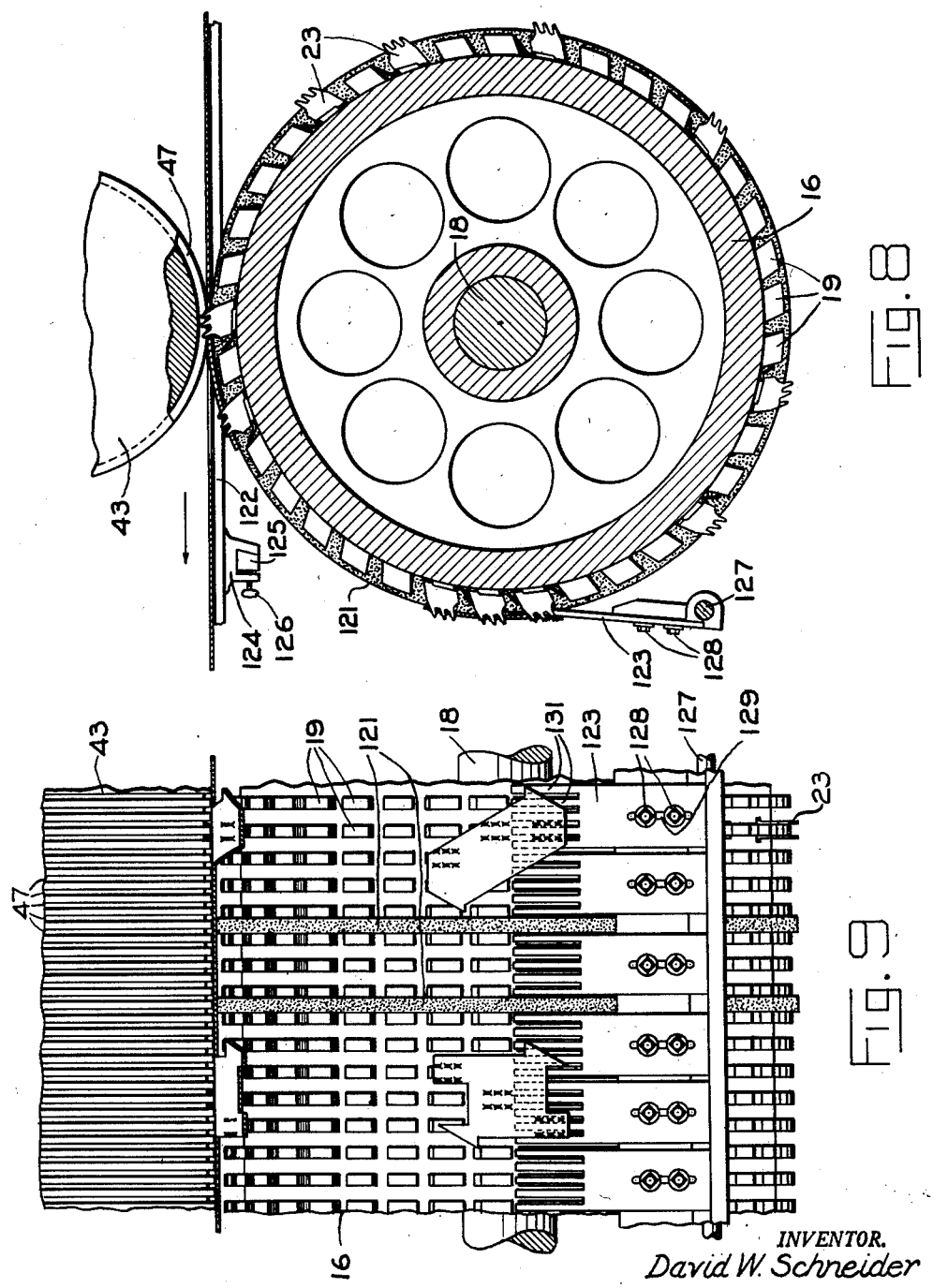

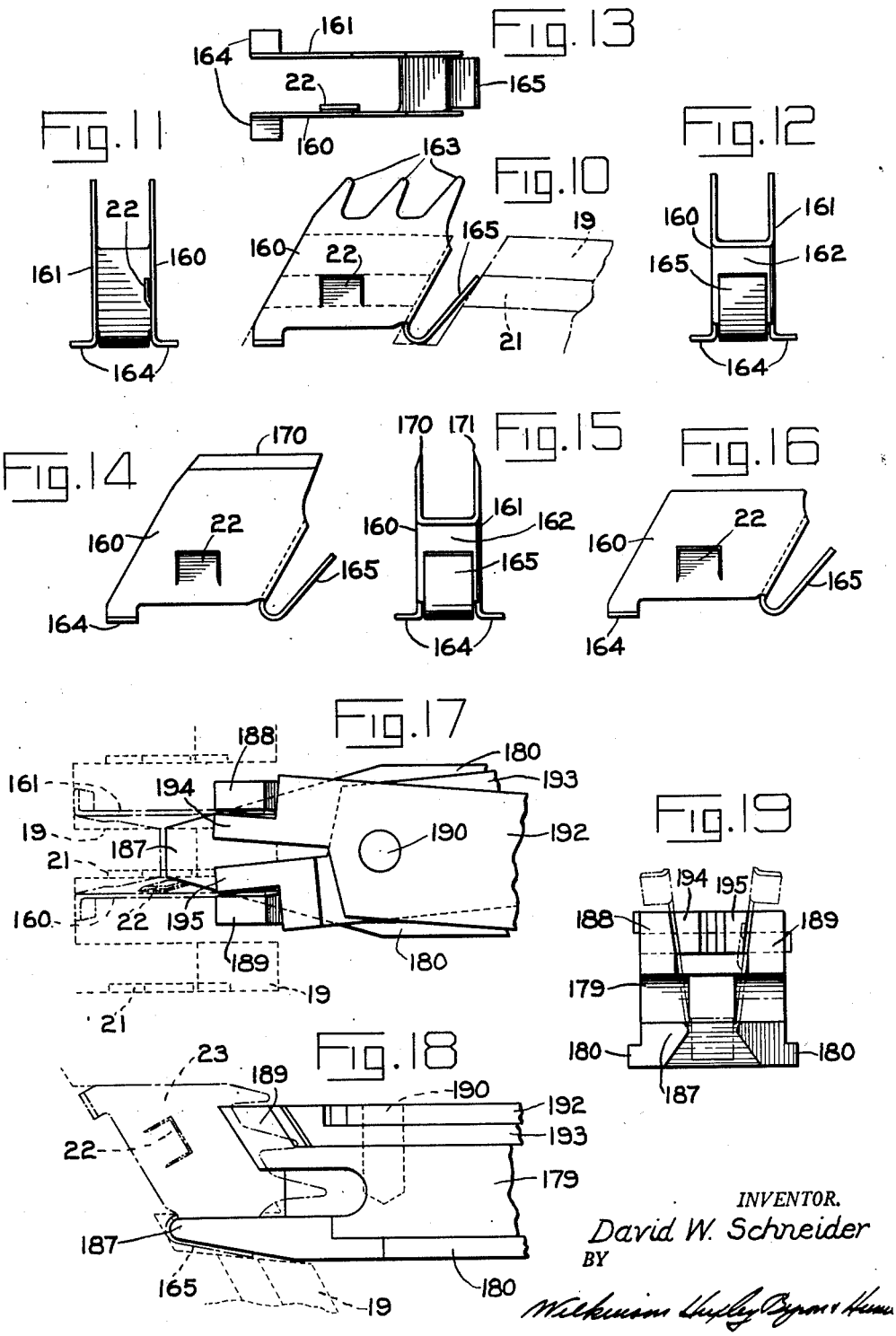

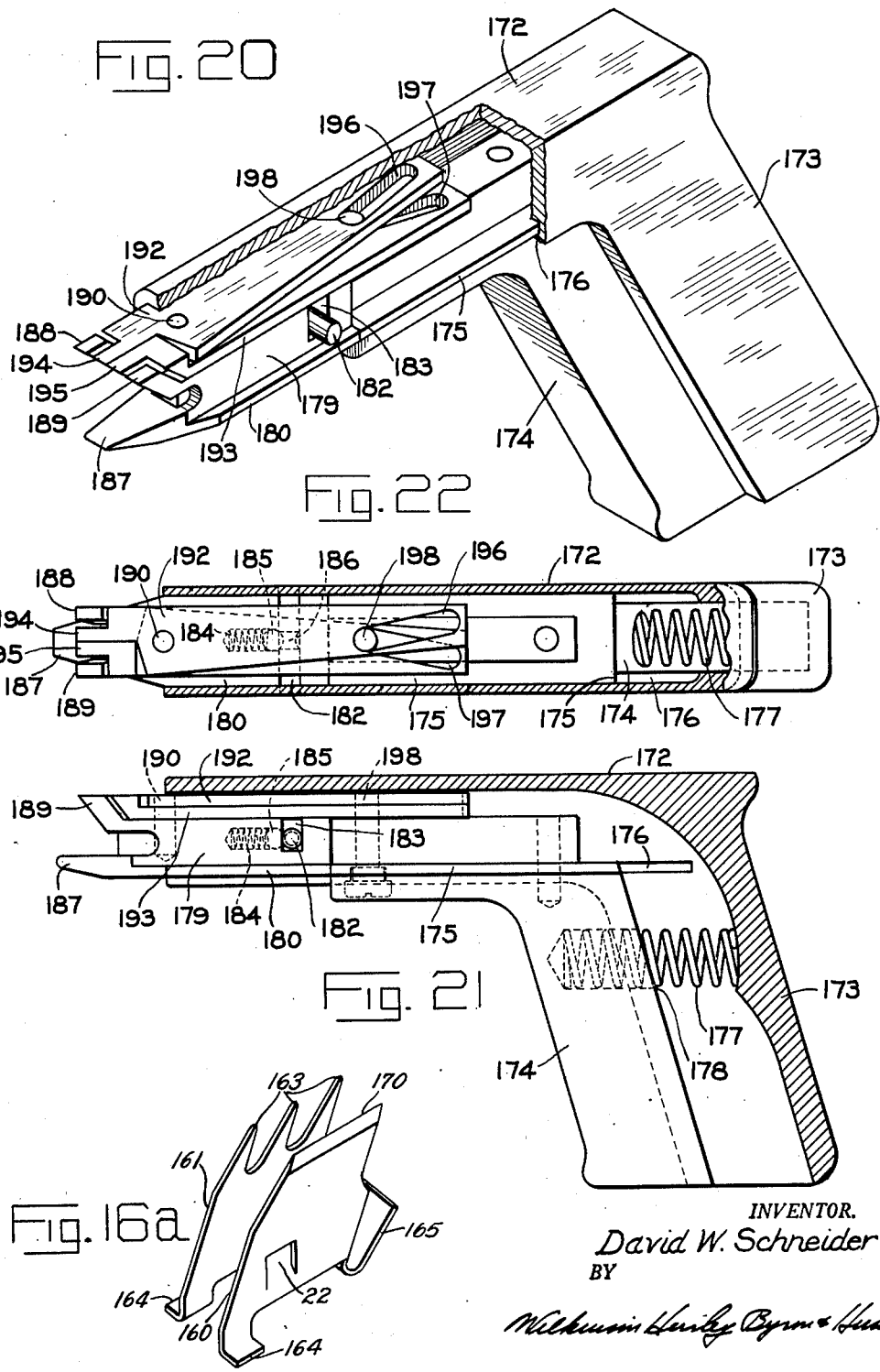

Patented May 11, 1954

2,677,994

UNITED STATES PATENT OFFICE 2,677,994

METHOD OF AND MEANS FOR AUTOMATICALLY PICKING WASTE MATERIAL FROM CARTON BLANKS AND THE LIKE ARTICLES

David W. Schneider, Crystal Lake, Ill., assignor to Miehle Printing Press and Manufacturing Company, Chicago, Ill., a corporation of Delaware Application September 2, 1949, Serial No. 113,886

16 Claims. (Cl. 93—58)

This invention primarily pertains to improvements in machines for automatically removing or "picking" the waste material or "snips" from large die cut sheets of folding carton blanks, as well as to a new method of performing such function. These improvements also include a novel manner and means for controlling the sheets during their travel to such machines.

My invention also relates to an improved type of sheet engaging elements which may comprise series of picking spurs, cutting knives, sheet supporting members, or any combination thereof, with which elements are associated means for positively locking them in their operative positions on a mounting.

Furthermore, an important purpose of the invention is to provide a novel positioning device by means of which said elements can be applied to and removed from such mounting.

As is well known in the art of manufacturing paper boxes or cartons by means of cutting and creasing dies, the box blanks are cut from large sheets of card board. The individual blanks are held together by small "nicks" provided at intervals along the cut lines and which are formed by nicking the cutting edges or knives of the die so that at the respective points the box material will not be completely cut through.

The large majority of carton blanks are of irregular contour, therefore a number of waste portions remain between adjacent blanks which portions must be removed or "picked" from the blanks before the blanks can be properly stacked and prepared for shipment.

It has already been proposed to perform the "picking" operation automatically, and I make reference in particular to U. S. Patent No. 1,983,708 issued December 11, 1934, to C. Ruble et al.

The principles disclosed in the Ruble structure for accomplishing this work involves the use of two complementary cylinders each provided with a series of peripheral grooves.

Within the grooves of one of these cylinders are placed, preferably by wedging, a number of spurs which extend into the grooves of the other cylinder and in a manner that as a processed sheet of blanks is advanced between the cylinders while they rotate, these spurs will penetrate the waste portions in the sheets and remove or "pick" them from it. I do not make any claim to such basic principle.

However, to provide improved and novel means for accomplishing this function more efficiently and more expediently is the outstanding object of my invention.

One of the important objects of my invention is that of providing novel sheet controlling mechanism, including means for advancing each succeeding sheet from the sheet carrying member of a cutting and creasing press, which is preferably of the two-revolution type, at the same lineal speed thereof until the sheet is completely free of said member, and to then reduce the speed of the sheet before it is presented to the waste picking device.

Among other objects of the invention is that of providing a variety of sheet engaging elements which will facilitate the separating of the waste material from the sheets of carton blanks and which elements shall function either as picking barbs, cutting edges, sheet supporting means, or any desired combination thereof. Associated with these elements, as well as with the mounting to which they are applied, I provide means whereby the elements shall be positively locked in their selected position, thereby averting any possible damage to the machine which might be caused by elements becoming loose and falling from their mounting at anytime while the machine is in operation.

Furthermore, it occurs quite frequently that the contour or design of the carton boxes to be produced is rather complex so that it requires the removal of narrow, irregularly shaped and closely adjacent small pieces of waste material from the processed sheets. It is therefore essential that the waste picking barbs can be placed in close proximity to each other and located so that they are aligned with such small pieces to effectively pick them from the sheets. To accomplish this result is another important object of my invention.

Other objects and advantages will become apparent from the description and appended claims when read in conjunction with the accompanying drawings which illustrate a preferred embodiment of my invention.

In the drawings,

Figure 1 is a side elevational view of my invention as used in conjunction with a conventional cutting and creasing press and associated delivery mechanism;

Figure 2 is a plan view thereof;

Figure 3 is a front view, partly in section, of the waste picking member and its associated drum;

Figure 4 is an enlarged view, in section, of a portion of Figure 3 and showing more clearly the locking means for the sheet engaging or picker elements;

Figure 5 is a diagrammatic side elevational view of the sheet advancing mechanism and means for decelerating the sheet;

Figure 6 is an enlarged side view looking from the opposite side of Figure 5 and showing the drive means for the sheet advancing reel;

Figure 7 is an enlarged side view, partly in section, of a portion of the sheet slow down mechanism;

Figure 8 is a sectional view through the waste picking member or drum and illustrates the manner in which the picker elements engage the waste snips;

Figure 9 is a front view of Figure 8 showing the combing means for removing the snips from the waste picking drum;

Figure 10 is a side view in elevation at an enlarged scale of an element formed with picking spurs;

Figures 11, 12 and 13 are rear, front and plan views respectively of the element depicted in Figure 10;

Figure 14 is a view in side elevation of an element formed with cutting edges;

Figure 15 is an end view of Figure 14;

Figure 16 illustrates an element in side elevation, modified to constitute a sheet supporting member;

Figure 16A is a perspective view of an element having one wall formed with picking spurs and the other as a cutting edge;

Figure 17 is an enlarged plan view illustrating the manner in which the side walls of an element are expanded and simultaneously gripped by the jaws of a positioning device;

Figure 18 is a side view of Figure 17 showing the manner in which the element engaging jaws of the positioning device support an element in order to insert it into and remove it from its mounting;

Figure 19 is a view in elevation taken from the left of Figure 18;

Figure 20 is a perspective view, partly in section, of the positioning device used to apply the elements to the mounting and remove them from it;

Figure 21 is a side elevational view of the device shown in Figure 20 with part of its frame or casing broken away so as to disclose the operating means;

Figure 22 is a plan view, partly in section, of Figure 21, and

Figure 23 is a fragmentary elevational view showing a journal housing and the structure for pivotally and adjustably supporting the same.

With reference to Figure 1 of the drawings, a preferred embodiment of my invention is shown as it is mounted on the frame 10 of a conventional cutting and creasing press of the type having a sheet carrying impression cylinder 11 and a reciprocating bed 12 onto which the dies are mounted whereby in cooperation with the impression cylinder, large sheets of card board or the like material are cut and creased to form a plurality of folding carton blanks.

The side frames 13 and 14 of the waste picking device, see Figures 1 and 2, are fixed securely to each side of the press frame 10, at the extreme front end thereof, and provide supporting and journalling means for the elements incorporated in my waste picking mechanism.

The waste picking drum 16, which supports the sheet engaging or picking elements in their selected positions corresponding to the waste snips in the die cut sheets, see Figures 2 and 3, is composed of a plurality of adjacent drum sections 17 removably carried on the supporting shaft 18 and extending transversely across the width of the cutting and creasing press between the side frames 13 and 14. This drum is located a sufficient distance away from the sheet carrying cylinder 11 to permit the sheets to move completely free of said cylinder before they are engaged by the picking elements on the drum 16. On the peripheral surface of the drum sections 17 and preferably formed integral therewith are projections 19 which are aligned in circumferential and transverse rows over the entire surface of the drum, thereby providing a multitude of mountings for positioning the sheet engaging or picker elements. Each projection 19 constitutes a separate mounting for the elements and is provided with a groove 21 which cooperates with a locking member 22 on each element 23 to thereby secure the elements on the respective projections 19, see Figure 4.

The shaft 18 and thereby the picking drum 16 is suitably journalled for rotation in the side frames 13 and 14 by means of the anti-friction bearings 24 and 26 which are seated in housings 27 and 28 fixed in the side frames 13 and 14 respectively.

This shaft is driven in timed relation to the sheet carrying cylinder 11 of the cutting and creasing machine and at a substantially reduced speed with respect thereto, by means of the gear 29 fixed on said shaft and which meshes with the gear 31 of the driving train of gears, see Figures 1 and 2. The gear 31 is in turn fixed on the shaft 32 which is journalled in the frame member 13 and is driven by means of the bevel gear 33 which meshes with a pinion 34 fixed to the end of the drive shaft 36. The opposite end of shaft 36 is provided with a pinion 37 which meshes with the pinion 38 mounted on shaft 39. The latter is driven by gear 41 which is in mesh with the main drive gear 42 of the cutting and creasing press.

Immediately above the waste picking drum 16 and arranged to cooperate therewith is the companion or female cylinder 43, Figures 1, 2 and 3, which is composed of sections 44 mounted securely on the supporting shaft 46. Each of the sections 44 is provided with annular grooves 47 in its periphery, which are spaced to align with the rows of the element supporting projections 19 on the picking drum 16. The grooves 47 provide a recess into which the teeth or spurs of the waste picking elements extend after they have pierced the waste snip in a sheet of box blanks.

The shaft 46 of the female cylinder 43 is rotatably mounted at each end in the bearings 48 and 49 which are in turn supported in the adjustable housings 51 and 52 respectively, see Figure 3. Each one of the housings 51 and 52 is formed with bifurcated arms 53, see Figures 1, 2 and 23, which are pivotally connected to the frame members 13 and 14 by means of pins 54. This construction permits the cylinder 43 to be raised or lowered with respect to the waste picking drum 16 and to an extent which will correspond to the thickness of the die cut sheets.

In Figure 23, I have indicated some conventional means whereby adjustment of the cylinder 43 with relation to the thickness of the sheets may be accomplished. This means preferably comprises set screws 56 which are threaded into the respective frame members 13 and 14 with the heads thereof engaging the arms 57 of the housings 51 and 52. These arms are constantly urged in clockwise direction to thereby maintain contact with the screws 56 by means of the bolts 58 which extend through a bore provided in the arms 57. These bolts are also threaded into the respective frame members 13 and 14. A compression spring 59 is positioned between the head of the bolts 58 and the arms 57.

The purpose of resiliently mounting the female cylinder 43 is to prevent damage to the mechanism in the event foreign matter of a thickness greater than that of the sheets should accidentally enter between said cylinder and the drum 16. In such case the female cylinder will merely be urged upwardly against the pressure of the springs 59, thereby avoiding any damage to the parts involved.

The female cylinder 43 is positively driven in timed relation to the picking drum by means of the gear 61 fixed on the shaft 46 and which meshes with the picking drum drive gear 29.

As a processed sheet leaves the sheet carrying cylinder 11 of the cutting and creasing press, it is under control of conventional guide rollers 62 and directed by stripping fingers 63, Figure 5, onto supporting bars 64 which guide the leading edge of the sheet into engagement with the advancing reels 65, a series of which are arranged transversely of the path of the sheet and in spaced relation on the shaft 66 which is journalled in the auxiliary frame members 67 and 68, see Figures 1, 2 and 5.

The sheet advancing reels 65 are rotated at the same lineal speed as that of the sheet carrying cylinder 11 and are driven preferably by means of the V-belt 69 which is tracked around the sheave 71 fixed to the shaft 66 and around the sheave 72 which is secured on the shaft 73 journalled in the bracket 74, see Figure 6. To the free end of shaft 73 is mounted the gear 76 which meshes with idler gear 77 rotatably carried on the stud 78, said stud being fixed in the side frame 13, see Figure 2. The gear 77 is driven by the waste picking drum drive gear 29.

To provide adjustment whereby any variation in the length of the V-belt 69, due to wear or other causes, can be compensated for and to facilitate installation and removal of said belt, the bracket 74, which supports the gear 76 and sheave 72, is rockably mounted on the stud 78 so it can be moved to either increase or decrease the distance between centers of the sheaves 71 and 72. Since any adjustment of the bracket 74 does not alter the radius between centers of the shafts 73 and 78, it will not affect the meshing relation of the gears 76 and 77.

The bracket 74 is also provided with arcuate slots 79 through which extend bolts 81 which are threaded into the side frame of the machine. When bracket 74 is set in the desired position, said bolts are tightened to lock it securely in place.

As best illustrated in Figure 5, operating in conjunction with the advancing reels 65 are the drop rollers 82 one of which is arranged immediately above each advancing reel and which function to press the sheet into engagement with their associated advancing reel to thereby create friction for the purpose of advancing the sheets towards the picking drum at the same lineal speed as that of the cylinder 11 until each sheet is completely free of said cylinder.

These drop rollers are rotatably mounted in levers 83 having a bifurcated end which is arranged to pivot on the shaft 84. Within this end, and rigidly fixed to shaft 84, is arranged the actuating lever 86, the free end of which extends to a position above the drop roller and the upper end of the lever 83. The levers 83 and 86 are connected by the threaded stud 87 which is pivotally attached to lever 83 with its free end passing through a bore provided in the lever 86. Thumb screws 88 and 89 are arranged on the stud 87 above and below the free end of lever 86 to provide adjustment whereby the extent of movement of the drop rollers can be varied with relation to the thickness of the fed sheets so as to obtain the desired amount of pressure on the sheets.

Shaft 84 and the mechanism mounted thereon is rotatably supported by a plurality of brackets 91 which in turn are rigidly fixed on the transverse member 92 supported in the side frames 13 and 14, see Figures 2 and 7.

The drop rollers 82, see Figure 5, are moved up and down, into and out of their operative position in timed relation to the oncoming sheets and this movement of the rollers is accomplished by means of the lever 93 which is rigidly fixed to one end of the shaft 84 and to which lever a rod 94 is pivotally attached. The other end of said rod is in turn connected to the arm 96 of a bell crank lever which is secured to a stud 97. The arm 98 of said lever carries a roller 99 which rides on a cam 101 carried on the picking cylinder shaft 18 to rotate therewith.

It will be seen that as the cam 101 rotates and the roller 99 traverses the high and low parts thereof, the arms 96 and 98 will be rocked to thereby move the drop rollers 82 up and down about the axis of the shaft 84, into and out of their sheet engaging position.

The roller 99 is maintained in constant contact with the cam 101 under the resilient pressure of a spring 102 which embraces a rod 103 pivoted to the free end of the arm 96 of the bell crank lever and extends through a bore provided in the bracket 104.

The reels 65 advance each successive sheet at cylinder speed until the trailing edge of the sheet is free of the cylinder 11 and the leading edge of it engages the registering guides 106, Figure 7. At least two of these guides are arranged in spaced relation on the supporting shaft 107. A series of sheet slow down reels 108 are also secured to said shaft and are placed thereon in positions corresponding to those of the advancing reels 65 on the shaft 66.

The sheet slow down reels 108 are stationary until the sheet engages the guides 106 when in their positions shown in Figure 7 in dotted lines. The reels are actuated to continue advancing the sheet to the picking cylinder but at a lower speed. At the start of their rotation, the peripheral speed of the reels 108 is the same as that of the advancing reels 65. However, they are immediately and gradually decelerated until they have reduced the speed of the sheet to substantially one half of the surface speed of the cylinder 11. The waste picking operation is performed at such reduced speed.

This reduction in speed of the oscillating slow down reels 108 and thereby the sheets, is accomplished by means of the segment 109 which is carried by a stud 111 mounted on the side frame 14, see Figure 5. This segment meshes with the slow down reel drive gear 112 fixed on the shaft 107. An arm 113 is formed integral with the segment 109 and carries a roller 114 arranged to ride over the cam 116 fixed on the shaft 18. Movement of the cam 116 effects a rocking motion of segment 109 which in turn transmits an intermittent oscillating motion of varying speed to the slow down reels 108 in timed relation to the feeding of the sheets. Also pivotally attached to the arm 113 is a rod 117 having its free end slidably inserted through a boss 118 and on which rod is mounted a compression spring 119. Pressure of the spring 119 constantly urges the segment in an anti-clockwise direction thereby maintaining the contact relation of the roller 114 with the cam 116.

As shown in Figure 5, operating in conjunction with the slow down reels 108 are a series of drop roller assemblies 120 which are identical in structure and function to those cooperating with the advancing reels 65. The slow down drop rolls 82' are moved to and from their operative position by a separate cam 101', see Figure 3, and are timed to engage the leading edge of the sheet immediately before the drop roller 82 rises to release the sheet.

The sheet is advanced by the reels 108 until the leading edge is engaged between the picking drum 16 and its associated female cylinder 43 at which time the drop rollers 82' move up to their inoperative position.

Control of the sheet and prevention of slippage of it as it passes between the drum 16 and cylinder 43 is then accomplished by a plurality of rings or tires 121, see Figures 3, 8 and 9, which are inserted into the grooves between the projections 19 at selected intervals across the width of the drum 16. The tires 121 extend above the projections 19 of the drum and they press the sheets against the companion cylinder 43 thereby creating friction to drive the sheets between the cylinders until the leading edge of each sheet is gripped by the delivery grippers.

Another function of the tires is to hold the sheets above the peripheral surface of the projections 19 to enable the stripping or guide fingers 122 as well as the teeth of combs 123, see Figure 8, to project beneath the box blanks and waste snips respectively.

As shown in said figure, a plurality of picking elements 23 are positioned about the periphery of the picking drum in locations corresponding to the waste areas in the sheets. As each sheet moves between the coacting drum and cylinder the teeth or spurs of the picking elements pierce the waste snips in the sheet and project into the grooves 47 of the cylinder 43. Continued rotation of these members causes the box blanks to ride over the stripping fingers 122 while the waste snips are withdrawn by the picking elements. These fingers are mounted on brackets 124 which can be moved into different positions along a supporting bar 125 and clamped thereto by means of thumb screws 126 or the like.

After the waste snips are picked from the sheets, they are stripped off the picking spurs by means of the combs 123, Figures 3, 8 and 9, which preferably are in series of sections adjustably supported on a transverse shaft 127 by means of bolts 128. The body portion of each comb section is provided with elongated slots 129 through which the bolts 128 extend and which permit adjustment of the combs to set the teeth 131 thereof in close proximity to the periphery of the drum 16. When the waste snips are stripped off by the combs 123, they fall into a receptacle 132, see Figure 1, or if preferred, a conveyor could be arranged to receive the waste material and remove it from the machine.

It is also desirable to provide some means whereby any loose pieces of waste material will be prevented from falling onto the die form on the reciprocating bed 12 thereby avoiding damage to the form as it passes under the cylinder 11. To obviate this possibility, a canvas curtain or the like 133, Figure 1, is stretched on an incline from the cylinder 11 to the end of the frames 13 and 14 directly beneath the waste picking unit, so that any waste that may fall onto the curtain 133 will eventually drop into the receptacle 132 or the like waste receiving device.

After the waste snips are picked from a sheet of box blanks the leading edge of the sheet is guided into the bite of the chain delivery grippers 134 of the delivery mechanism 136 which carries them to the pile table 137, see Figures 1 and 2.

The chain delivery grippers are driven in timed relation to the picking drum by means of the gear 138 which is driven from the main drive shaft through the train of gears comprising gear 139 fixed to the end of shaft 32, to gear 141 and thence through gear 142.

A reciprocating carriage 143 is arranged to cooperate with the chain delivery grippers to support the trailing portion of each sheet as it is carried to the delivery pile. This prevents any undue bending or dragging of the sheet which might otherwise cause the connecting "nicks" to break, with the result that the box blanks would fall apart, thereby seriously hampering the stacking operation.

The reciprocating carriage 143 is supported by means of rollers 144, two of which are shown in Figure 2, which ride in tracks provided therefor on the chain delivery frame. The carriage is reciprocated in timed relation to the picking drum by means of the lever 146 which is fixed to the end of shaft 18, Figures 1 and 2. The free end of this lever is connected by means of the rod 147 to lever 148 mounted on the shaft 149 and it will be seen that rotation of lever 146 with the shaft 18 will impart a rocking motion to the shaft 149. Fixed to this shaft, at each side of the press, are the levers 151 and 152 to the free ends of which are pivoted the connecting rods 153, 154 respectively which are connected by means of the links 156 and 157 to the carriage 143. Therefore, as the levers 151 and 152 oscillate with the shaft 149 a reciprocating motion will be imparted to the carriage 143 in precise timed relation to the feeding of the sheets so that during the forward stroke of the carriage the trailing portion of the sheets while being delivered will be supported by it, whereas during its return stroke the sheets will deposit smoothly onto the pile table 137.

From the foregoing, the sequence of operation of the various mechanisms involved will be readily apparent.

I will now proceed to describe in detail the various species and functions of sheet engaging elements as well as of the positioning device by means of which the elements are manipulated for insertion into and removal from their mounting.

Referring to Figures 10 to 13 of the drawings, which figures illustrate a waste picking element, at an enlarged scale, it will be seen that they are formed from a single piece of material, preferably spring steel, having side walls 160 and 161 which are joined at one end by an inclined front wall 162. Each one of the side walls is provided along its top edge with a series of waste picking spurs 163 which, in operation, pierce the waste portion or snip in a sheet of box blanks and strip it therefrom. It will be understood that there should be several picking spurs aligned with each individual waste portion to be stripped from a sheet of box blanks. For that reason, I preferably space the spurs approximately one-quarter of an inch apart. Likewise, I find it of advantage to hold the width of the body portion of the elements as well as the spacing of the grooves in the element mounting to a similar dimension, see Figure 4 of the drawings.

In some cases where the waste portion is exceptionally large, it will be found to advantage to position several waste picking elements so as to engage various parts of one waste portion in order to assure removal of the entire piece.

At the base of each side wall of said various elements and projecting outwardly therefrom, are feet 164 which provide a base or support for the element when placed in position on the mounting.

A lip 165 is formed integral with the front wall 162 and acts as a spacer to prevent circumferential movement of the barb when set in its operative position on the mounting. It also provides a seat or base for the front end of the elements.

When installed on its mounting, which may be a cylindrical member or any other suitable support, the walls of the body of the element embrace an associated projection or tooth 19, see Figure 10, and it is locked securely thereon by means of the lip or detent 22 which projects into a groove or recess 21 formed in the tooth 19.

Frequently a narrow strip across the full width of the leading edge of a sheet of cut and creased carton blanks is waste because this is the portion by which the sheet is held in the bite of the grippers of the cutting and creasing machine. To strip this edge from the sheet in one long piece would involve difficulties due to interference by the stripping fingers which guide the box blank portions of the sheet to the delivery grippers as they move over the picking cylinder.

Usually, such narrow strips are cut into shorter lengths by means of cutting knives arranged in the die whereby the carton blanks are cut and creased. Very often however, and depending on the character of the job, it is desirable to retain this strip at the gripper edge of the sheets in order to hold the blanks together in one piece until the processed sheets are presented to the automatic waste picking device, otherwise the carton blanks will detach themselves from the sheets before they reach such device. Therefore, in order to obviate this difficulty, I provide waste cutting elements such as are disclosed in Figures 14 and 15. They are arranged in space relation transversely of the cylinder to engage and cut the long strip of waste into short lengths which can then be easily picked from the drum 16. The body portion of this cutting element is substantially the same as that of the waste picking elements except that the top edge of at least one of the walls 160 and 161 is formed into waste cutting knives 170 and 171 instead of spurs 163. As an alternative, however, one of said walls could bear picking spurs while the other would have a cutting edge as illustrated in Figure 16A.

In some instances where the design of a box blank creates an intricate, irregularly shaped waste snip, a particularly flexible portion of a box blank may tend to adhere to an adjacent waste snip as it is being removed, due to the connecting nicks. This causes the blank to be pulled down slightly with the waste, which causes a portion of the blank to pass under the sheet guides instead of over them. As a result, the sheet becomes torn and entangled in the mechanism, making it necessary to stop the machine in order to clear out the torn pieces.

To prevent such a condition, I provide a supporting element, as shown in Figure 16, which is a modified version of the picking element with the spurs 163 removed. The top edges of the side walls 160 and 161 then act as a sheet support which can be placed on the mounting in any position corresponding to that portion of any box blank which has a tendency to adhere to an adjacent waste snip as it is being picked from the sheet, to assure space for the sheet guides to enter under the blank and guide it properly to the delivery mechanism.

To facilitate the installation and removal of the elements, I have developed a positioning device onto which the elements are placed and which expands and simultaneously grips the walls of the barb securely so it can be easily inserted into or removed from its associated seat on the mounting.

A preferred embodiment of such device is illustrated in Figures 20, 21 and 22 wherein it will be seen that the tool comprises a frame or outer shell 172 of U-shaped construction having a depending portion 173 which forms part of the handle by which the tool is manipulated. This portion is hollowed out to receive the movable lever 174, the top portion of which is provided with flanges 175 which are slidable in the grooves 176 provided therefor in the shell 172. A compression spring 177 supported in the bore 178 formed in the lever 174 constantly urges this lever into its neutral or open position, exerting pressure between the inner wall of handle 173 and the lever 174.

Immediately forward of lever 174 and providing a stop therefor, is the stationary jaw member 179 which is also supported in the grooves 176 by means of flanges 180. The jaw member 179 is fixed securely in position by means of the pin 182 which is fitted within the slot 183 in the jaw member 179 with its ends projecting into openings in the frame 172. The pin is held in position by means of a spring 184 and ball 185 which are inserted in a bore provided in the stationary jaw member, with said ball projecting into a groove 186 formed in the periphery of the pin 182 at the center thereof.

The member 179 is also formed with an element supporting member such as a nose 187 and two upwardly projecting jaws 188 and 189 the purposes of which will be explained hereinafter.

Pivotally mounted on the jaw member 179 by means of the pin 190 are the upper and lower jaw members or spreaders 192 and 193. These spreaders are formed with the jaws 194 and 195 which are disposed between the stationary jaws 188 and 189.

At their opposite ends the spreaders are provided with diagonal slots 196, 197 respectively which are in opposed relation to each other. A pin 198, fixed in the lever 174, projects into the slots 196 and 197. It will be seen that movement of said lever to the right will cause the pin 198 to slide in said diagonal slots causing the spreaders 192 and 193 to pivot in opposite directions about the pin 190 with the result that the jaws 194 and 195 move toward their coacting members 188 and 189 respectively as is shown more clearly in Figures 17, 18 and 19.

In this position the jaw members 194 and 195 spread the walls 160 and 161 of the waste engaging element apart while at the same time clamping them securely against their associated jaws 188 and 189. With its walls spread open in this manner the detent or lip 22 of the element easily clears the sides of the mounting projection 19 permitting ready installation on the cylinder. After the element is seated on the mounting the positioning device is released, permitting the walls of the element to return to their normal position with the lip 22 fitting into the groove 21 on the mounting projection 19, thereby locking the element securely in position.

As shown in Figures 8 and 10, any circumferential movement of the element after it is installed is prevented by the lip 165 which contacts the preceding cylinder projection 19 and urges the front wall 162 of the element against the projection on which it is mounted.

When installing an element on a predetermined mounting projection 19, the positioning device is placed with the handle 173 in the palm of the hand and the fingers lightly gripping the lever 174. Then an element is placed in position with the lip 165 fitted around the nose 187 and the walls 160, 161 between the jaws 194, 188 and 195, 189. The lever 174 is then gripped tightly which action compresses spring 177 as the lever 174 slides rearwardly in the grooves 176. This causes the pin 198 to slide in the slots 196 and 197 effecting a turning movement of the spreader members 192 and 193 in opposite directions about the pin 199. As the spreader members move, the jaws 194 and 195 separate, causing the walls 160 and 161 of the element to expand and they simultaneously grip said walls securely between the movable jaws 194 and 195 and the stationary counter parts 188 and 189. The element is then inserted over the desired mounting projection as indicated in dotted lines in Figures 17 and 18. Sufficient force is exerted on the device to cause the nose 187 to seat the lip 165 of the element securely on the mounting after which the lever 174 is released allowing the jaws 194 and 195 to return to their normal positions. This permits the walls of the element to resume their natural positions with the lip 22 moving into the groove 21 on the side of the mounting projection thereby locking the element securely in position.

To remove an element, the positioning device is inserted into the element in the same manner, and the lever 174 is then actuated to expand the walls of the element until the lip 22 is free of the groove 21 and the walls are gripped between the jaws 188, 194 and 189, 195. Then the element can be withdrawn from the mounting.

While I have herein set forth a preferred embodiment of my invention, I do not wish to be limited to any specific details such as I have disclosed, because modifications in the construction and arrangement of parts involved may be made without departing from the scope of my invention and which I aim to cover in the claims appended hereto.

I claim:

1. A method of handling sheets of carton blanks for removing waste portions from said sheets after they have been die cut by a die cutting member, comprising the steps of advancing the sheets at the same peripheral speed as said member until they are completely clear thereof, reducing the linear speed of each individual sheet, removing the waste portions from each individual sheet while the sheet is traveling at said reduced speed, whereby the individual carton blanks are partially separated, and finally delivering said partially separated blanks in a substantially horizontal plane and discharging the waste material removed from the sheets in another plane.

2. A method of handling sheets of carton blanks for removing waste portions from said sheets after said sheets have been die cut by a die cutting member, comprising the steps of advancing the sheets at the same peripheral speed as said member until they are completely clear thereof, registering the leading edge of each individual sheet, and immediately thereafter materially reducing their linear speed, removing the waste portions from each individual registered sheet while the sheet is travelling at said reduced speed, whereby to partially separate the individual carton blanks, conveying the partially separated carton blanks in a substantially horizontal plane to a point of deposit, and discharging the waste portions removed from the sheets in a plane below said blanks.

3. In a machine of the character described, the combination with a sheet carrying cylinder of, a cutting and creasing machine for processing sheets of carton blanks having waste snips between the blanks, of first sheet conveying means for receiving individual sheets from said sheet carrying cylinder and having operation to advance the sheets at a linear speed equal to the peripheral speed of the cylinder until the sheets are completely free of said cylinder, second sheet conveying means arranged to receive the individual sheets thus advanced by the first sheet conveying means and having operation to materially reduce their linear speed, mechanism for removing the waste snips from the sheets including a rotary waste picking drum having elements mounted thereon for operation on the sheets, said second sheet conveying means presenting the individual sheets to the waste picking drum for engagement and operation thereon by said elements at said reduced speed, and delivery means for conveying the sheets so processed by the waste picking drum to a point of deposit.

4. In a machine of the character described, the combination with a sheet carrying cylinder of a cutting and creasing machine for processing sheets of carton blanks having waste snips between the blanks, of mechanism for removing the waste snips from the sheets including a rotary waste picking drum having elements mounted thereon for operation on the sheets, first sheet conveying means and second sheet conveying means located between the sheet carrying cylinder and the waste picking drum, said first sheet conveying means receiving the individual sheets from the sheet carrying cylinder and having operation to advance the sheets toward the waste picking drum at a linear speed equal to the peripheral speed of the cylinder until the sheets are completely free of the cylinder, said second sheet conveying means being arranged to receive the individual sheets thus advanced and having operation to materially reduce their linear speed and to present the sheets to said waste picking drum at said reduced speed, sheet registering means in associated relation with said second sheet conveying means for aligning the leading edge of the sheets with the waste picking drum, and delivery means for conveying the sheets so processed by the waste picking drum to a point of deposit.

5. In a machine of the character described, the combination with a sheet carrying cylinder of a cutting and creasing machine for processing the sheets of carton blanks having waste snips between the blanks, of mechanism for removing the waste snips from the sheets including a rotary waste picking drum having elements mounted thereon for operation on the sheets, first sheet conveying means and second sheet conveying means located between the sheet carrying cylinder and the waste picking drum, said first sheet conveying means including constantly rotating members for receiving the individual sheets from the sheet carrying cylinder and having operation to advance the sheets toward the waste picking drum at a linear speed equal to the peripheral speed of the cylinder until the sheets are completely free of said cylinder, said second sheet conveying means including oscillating members arranged to receive the individual sheets thus advanced and having operation to materially reduce their linear speed and to present the sheets to said waste picking drum at said reduced speed, sheet registering means mounted for movement with said oscillating members, said sheet registering means engaging the sheets as they are advanced to the second sheet conveying means and operating simultaneously to initiate said reduction in linear speed and align their leading edges with the waste picking drum, and delivery means for conveying the sheets so processed by the waste picking drum to a point of deposit.

6. In a machine for automatically removing waste snips from die-cut sheets of carton blanks, the combination of side frame members, a waste picking drum journalled for rotation in said frame members, a complementary cylinder arranged to cooperate with said drum, means mounting said cylinder for adjustment relative to said drum and including journal housings pivotally mounted on said frame members, adjustable means associated with said housings and having operation to selectively position said housings and therewith the cylinder whereby to adjust the clearance between the cylinder and the drum with relation to the thickness of the sheets being processed, resilient spring means associated with said adjustable means in a manner to permit elevating movement of the housings and therewith the cylinder against the tension of said resilient means, and screw means having operation whereby to vary the tension of said resilient means.

7. In mechanism for picking waste portions from sheets of carton blanks, the combination of a waste picking drum having projections on its peripheral surface, said projections being aligned longitudinally and circumferentially to form a grid pattern whereby longitudinal and circumferential grooves are provided in the drum and which alternate with rows of projections, picking elements selectively positioned on the drum by being releasably locked to certain projections respectively, a coacting cylinder arranged parallel with and in close proximity to said drum, a series of stripper fingers arranged to strip the picked carton blanks off said drum, a series of combing fingers operative to remove the picked waste portions from the picking elements on the drum, and a plurality of resilient tires arranged in spaced relation on the drum in selected circumferential grooves, said tires extending above the projections so as to contact the carton blanks whereby to prevent slippage of the blanks as they pass between the cylinder and said drum and to provide clearance for said stripper fingers and combing fingers whereby the fingers may enter beneath the carton blanks and picked waste portions respectively.

8. In mechanism for picking waste portions from sheets of carton blanks, the combination of a waste picking drum having projections on its peripheral surface, said projections being aligned longitudinally and circumferentially to form a grid pattern whereby longitudinal and circumferential grooves are provided in the drum and which alternate with rows of projections, picking elements selectively positioned on the drum by being releasably locked to certain projections respectively, a coacting cylinder arranged parallel with and in close proximity to said drum, said coacting cylinder having a plurality of grooves formed in its peripheral surface and which are aligned with the circumferential grooves in the drum, and a plurality of resilient tires arranged in spaced relation on the drum in selected circumferential grooves, said tires extending above the projections so as to contact the carton blanks whereby to prevent slippage of the carton blanks as they pass between it and said drum.

9. In mechanism for picking waste portions from sheets of carton blanks, the combination of a waste picking drum having projections on its peripheral surface, said projections being aligned longitudinally and circumferentially to form a grid pattern whereby longitudinal and circumferential grooves are provided in the drum and which alternate with rows of projections, sheet engaging elements adapted to be mounted on said projections in selective locations with relation to the waste portions to be picked from the carton blanks, said sheet engaging elements each comprising a body portion having side walls adapted to engage the side walls of a projection and means provided on at least one side wall of each sheet engaging element adapted to have interlocking engagement with a recess formed in the adjacent side wall of the projection, whereby the sheet engaging elements are releasably locked to their respective projection.

10. In mechanism for picking waste portions from sheets of carton blanks as defined by claim 9, wherein a series of waste picking spurs are formed along the top edge of each side wall of certain sheet engaging elements.

11. In mechanism for picking waste portions from sheets of carton blanks as defined by claim 9, wherein at least one side wall of certain sheet engaging elements along the top edge thereof is formed to provide a waste cutting edge.

12. In mechanism for picking waste portions from sheets of carton blanks as defined by claim 9, wherein the side walls of certain sheet engaging elements are formed to provide sheet supporting means.

13. In mechanism for picking waste portions from sheets of carton blanks as defined by claim 9, wherein one side wall of certain sheet engaging elements is formed to provide waste picking spurs along the top edge thereof, and the other side wall of said elements is formed to provide a waste cutting edge.

14. In mechanism for picking waste portions from sheets of carton blanks, the combination of a waste picking drum having projections on its peripheral surface, said projections being aligned longitudinally and circumferentially to form a grid pattern whereby longitudinal and circumferential grooves are provided in the drum and which alternate with rows of projections, sheet engaging elements adapted to be mounted on the projections in selective locations with relation to the waste portions to be picked from the carton blanks, said sheet engaging elements each comprising a body portion having spaced side walls, a connecting front wall, and a lip portion extending outwardly of the front wall, and said sheet engaging elements each being mounted on a projection by having the side walls thereof engage the side walls of the projection, with the front wall in engagement with an end wall of the projection, and with the lip portion being disposed in a longitudinal groove and adapted to contact an end wall of an adjacent projection.

15. Mechanism for picking waste portions from sheets of carton blanks as defined by claim 14, additionally including a locking member struck from the material of one side wall of each sheet engaging element and adapted to have interlocking engagement with a recess formed in the adjacent side wall of its projection, whereby the sheet engaging elements are releasably locked to their respective projection.

16. In a machine of the character described, the combination with a sheet carrying cylinder of a cutting and creasing machine for processing sheets of carton blanks having waste snips between the blanks, of first sheet conveying means comprising a series of continuously rotating reels and coacting drop rollers for receiving individual sheets from said sheet carrying cylinder and having operation to advance the sheets at a linear speed equal to the peripheral speed of the cylinder until the sheets are completely free of said cylinder, second sheet conveying means comprising a series of oscillating reels and coacting drop rollers arranged to receive the individual sheets thus advanced by the first sheet conveying means, drive means having operation to oscillate said reels so that their surface speed is substantially equal to the speed of the sheets when first they engage the sheets and thereafter their speed and consequently the speed of the sheets is progressively reduced, a rotary waste picking drum having elements mounted thereon for operation on the sheets to remove the waste snips therefrom, said second sheet conveying means presenting the individual sheets to the waste picking drum at said reduced speed, and sheet registering means mounted for oscillation movement with the reels of said second sheet conveying means for aligning the leading edge of the sheets with the waste picking drum, said waste picking drum being spaced from the sheet carrying cylinder a sufficient distance to accommodate the first and second sheet conveying means whereby the registering means will have operation to register a sheet after the sheet is completely free of the sheet carrying cylinder and before the sheet is delivered to the waste picking drum.

References Cited in the file of this patent

UNITED STATES PATENTS

| Number | Name | Date |
|---|---|---|
| 372,624 | Jaeger | Nov. 1, 1887 |
| 1,742,335 | Willsea | Jan. 7, 1930 |
| 1,977,812 | Swift | Oct. 23, 1934 |
| 1,983,708 | Ruble et al. | Dec. 11, 1934 |
| 1,987,224 | Bergstein | Jan. 8, 1935 |
| 2,035,857 | Adsit | Mar. 31, 1936 |